United States Patent
Lee et al.

(10) Patent No.: US 9,226,283 B2
(45) Date of Patent: Dec. 29, 2015

(54) SCANNING METHOD AND APPARATUS IN WIRELESS ACCESS SYSTEM

(75) Inventors: Eunjong Lee, Anyang-si (KR); Inuk Jung, Anyang-si (KR); Giseon Ryu, Anyang-si (KR); Youngsoo Yuk, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 13/640,555

(22) PCT Filed: Apr. 12, 2011

(86) PCT No.: PCT/KR2011/002549
§ 371 (c)(1),
(2), (4) Date: Dec. 24, 2012

(87) PCT Pub. No.: WO2011/129574
PCT Pub. Date: Oct. 20, 2011

(65) Prior Publication Data
US 2013/0136014 A1     May 30, 2013

Related U.S. Application Data

(60) Provisional application No. 61/323,344, filed on Apr. 12, 2010, provisional application No. 61/329,093, filed on Apr. 29, 2010, provisional application No. 61/332,180, filed on May 6, 2010, provisional
(Continued)

(30) Foreign Application Priority Data

Apr. 11, 2011     (KR) .................. 10-2011-0033253

(51) Int. Cl.
*H04W 4/00*     (2009.01)
*H04W 72/04*    (2009.01)
(Continued)

(52) U.S. Cl.
CPC ............ *H04W 72/042* (2013.01); *H04W 36/18* (2013.01); *H04W 48/16* (2013.01); *H04W 36/0083* (2013.01); *H04W 36/06* (2013.01); *H04W 36/30* (2013.01)

(58) Field of Classification Search
CPC . H04W 36/06; H04W 36/18; H04W 36/0055; H04W 88/08; H04W 36/30
See application file for complete search history.

(56) References Cited

U.S. PATENT DOCUMENTS 8,462,863 B1 *  6/2013  Zhang et al. ................... 375/260
2008/0026760 A1 *  1/2008  Park et al. ..................... 455/437
(Continued)

FOREIGN PATENT DOCUMENTS

| CN | 1732642 | 2/2006 |
|----|---------|--------|
| CN | 101668319 | 3/2010 |

(Continued)

OTHER PUBLICATIONS

Japan Patent Office Application Serial No. 2013-504811, Office Action dated Sep. 25, 2013, 3 pages.
(Continued)

*Primary Examiner* — Mounir Moutaouakil
(74) *Attorney, Agent, or Firm* — Lee, Hong, Degerman, Kang & Waimey

(57) ABSTRACT

A method for scanning assigned carriers in a multicarrier system may include receiving a multicarrier advertisement message from a base station, the multicarrier advertisement message including scan reporting trigger control information of assigned secondary carriers, performing scanning for the assigned secondary carriers, and reporting the scan results to the base station when a specific metric measured by the scanning meets a condition set in the scan reporting trigger control information.

16 Claims, 4 Drawing Sheets

Related U.S. Application Data application No. 61/333,217, filed on May 10, 2010, provisional application No. 61/350,924, filed on Jun. 3, 2010, provisional application No. 61/405,210, filed on Oct. 21, 2010, provisional application No. 61/413,988, filed on Nov. 16, 2010.

(51) Int. Cl.
*H04W 36/18* (2009.01)
*H04W 48/16* (2009.01)
*H04W 36/30* (2009.01)
*H04W 36/06* (2009.01)
*H04W 36/00* (2009.01)

(56) References Cited

U.S. PATENT DOCUMENTS

| | | | |
|---|---|---|---|
| 2009/0163206 A1* | 6/2009 | Adatrao et al. | 455/436 |
| 2010/0062765 A1 | 3/2010 | Jung et al. | |
| 2010/0087152 A1 | 4/2010 | Mourad | |
| 2010/0254351 A1 | 10/2010 | Wang et al. | |
| 2011/0170519 A1* | 7/2011 | Zhang et al. | 370/331 |
| 2011/0255478 A1* | 10/2011 | Shen et al. | 370/328 |
| 2011/0255517 A1* | 10/2011 | Wang | 370/332 |
| 2012/0021792 A1* | 1/2012 | Shen et al. | 455/509 |
| 2012/0140638 A1* | 6/2012 | Zhao et al. | 370/241 |
| 2012/0329382 A1* | 12/2012 | Brisebois et al. | 455/1 |
| 2013/0136014 A1* | 5/2013 | Lee et al. | 370/252 |

FOREIGN PATENT DOCUMENTS

| | | |
|---|---|---|
| EP | 2031932 | 3/2009 |
| JP | 2009060611 | 3/2009 |
| JP | 2010011445 | 1/2010 |
| JP | 2010527165 | 8/2010 |
| JP | 2011521593 | 7/2011 |
| WO | 2009060650 | 5/2009 |
| WO | 2009084465 | 7/2009 |
| WO | 2009142954 | 11/2009 |
| WO | 2010/016680 | 2/2010 |
| WO | 2010025604 | 3/2010 |

OTHER PUBLICATIONS

3rd Generation Partnership Project (3GPP), "Technical Specification Group Radio Access Network; Evolved Universal Terrestrial Radio Access (E-UTRA) Radio Resource Control (RRC); Protocol specification (Release 8)," 3GPP TS 36.331 V8.6.0, Jun. 2009, 207 pages.

The State Intellectual Property Office of the People's Republic of China Application Serial No. 201180023293.X, Office Action dated Nov. 4, 2014, 8 pages.

U.S. Appl. No. 14/456,597, Office Action dated Apr. 24, 2015 10 pages.

* cited by examiner

Fig. 1
PRIOR ART
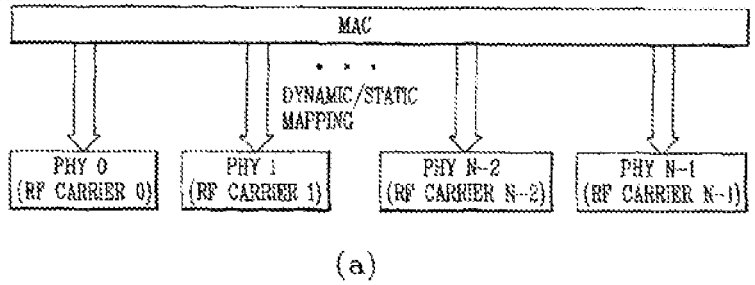
(a)
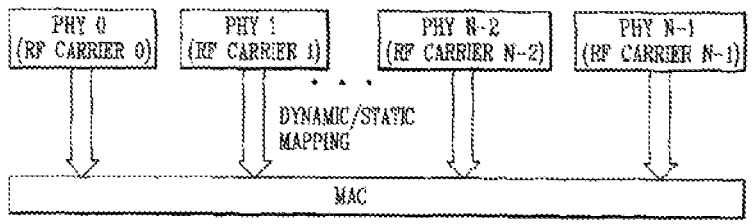
(b)
Fig. 2
PRIOR ART
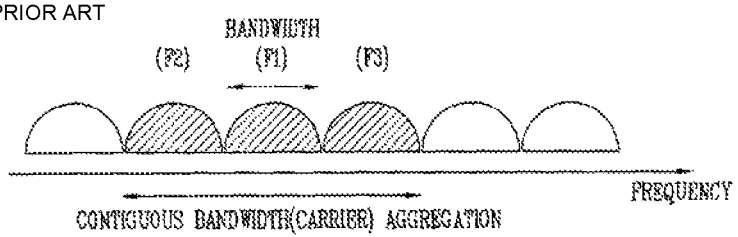
(a)
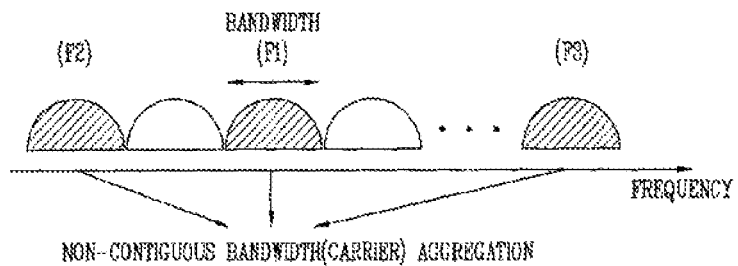
(b)

Fig. 3
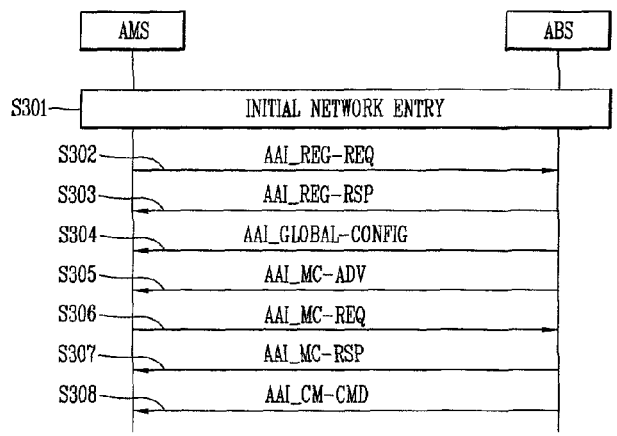
Fig. 4
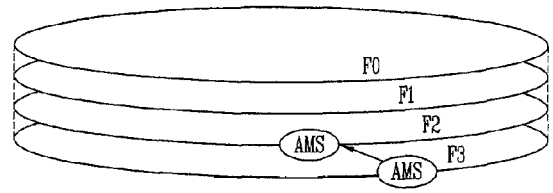
(a)
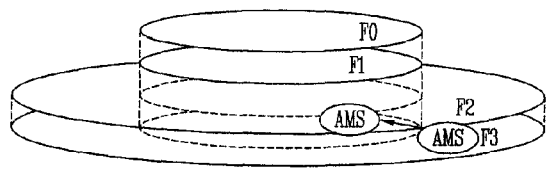
(b)
Fig. 5
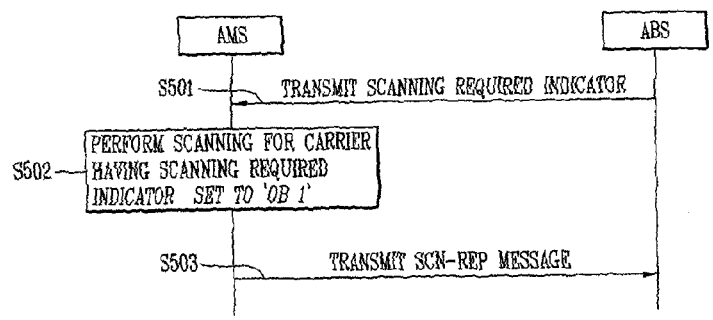

Fig. 6
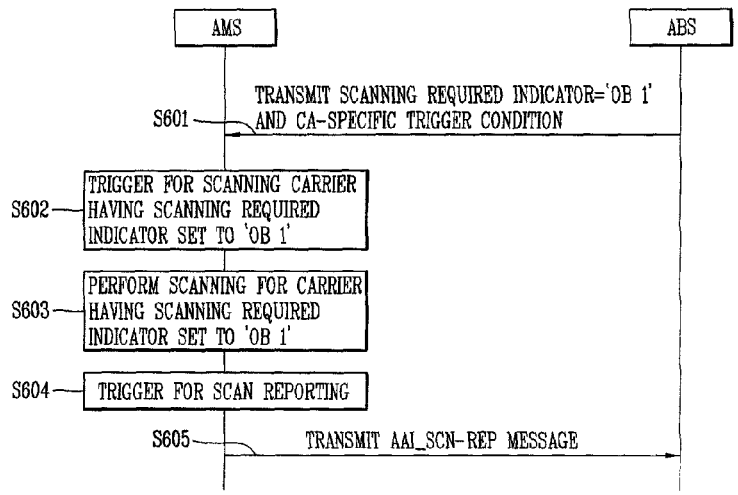
[Fig. 7]
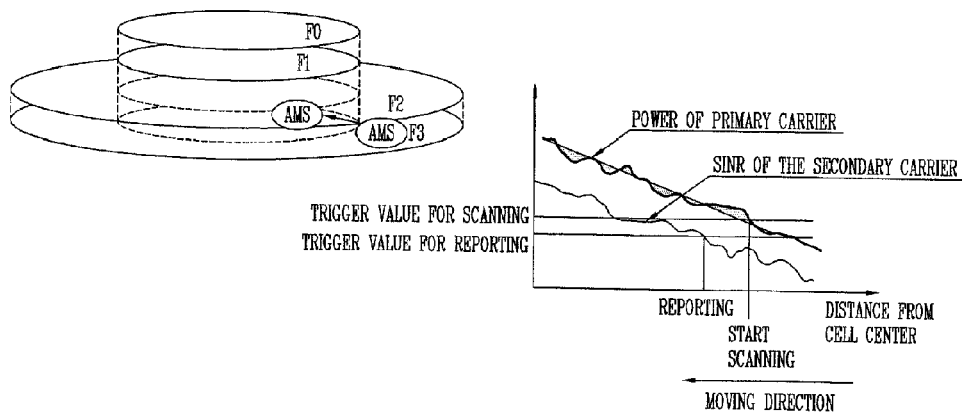
Fig. 8
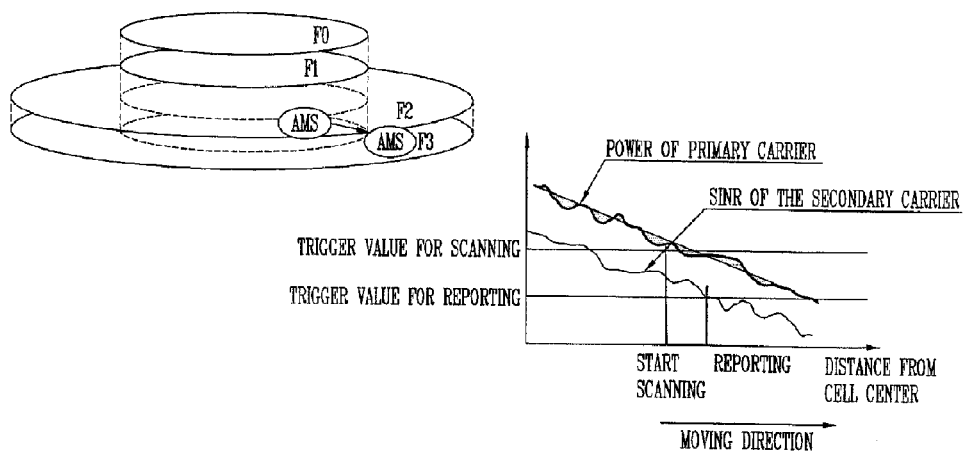

SCANNING METHOD AND APPARATUS IN WIRELESS ACCESS SYSTEM

CROSS-REFERENCE TO RELATED APPLICATIONS

This application is the National Stage filing under 35 U.S.C. 371 of International Application No. PCT/KR2011/002549, filed on Apr. 12, 2011, which claims the benefit of earlier filing date and right of priority to Korean Patent Application No. 10-2011-0033253, filed on Apr. 11, 2011, and also claims the benefit of U.S. Provisional Application Ser. No. 61/323,344, filed on Apr. 12, 2010, U.S. Provisional Application Ser. No. 61/329,093, filed on Apr. 29, 2010, U.S. Provisional Application Ser. No. 61/332,180, filed on May 6, 2010, U.S. Provisional Application Ser. No. 61/333,217, filed on May 10, 2010, U.S. Provisional Application Ser. No. 61/350,924, filed on Jun. 3, 2010, U.S. Provisional Application Ser. No. 61/405,210, filed on Oct. 21, 2010, and U.S. Provisional Application Ser. No. 61/413,988, filed on Nov. 16, 2010, the contents of which are all hereby incorporated by reference herein in their entirety.

TECHNICAL FIELD

The present invention relates to a scanning method and apparatus, and more particularly, a scanning method and apparatus for assigned secondary carriers belonging to a base station.

BACKGROUND ART

Hereinafter, description will be briefly given of carriers.

A user may perform modulation on the amplitude, frequency, and/or phase of a sine wave or a periodic pulse wave to include information which is desired to be transmitted. Here, the sine wave or pulse wave serving to convey information is called a carrier.

Methods for modulating a carrier include a single-carrier modulation (SCM) scheme and a multi-carrier modulation (MCM) scheme. The SCM scheme performs modulation such that all information is carried on a single carrier.

The MCM scheme divides an entire bandwidth channel of one carrier into sub-channels having multiple narrow bandwidths and transmits multiple narrowband sub-carriers through respective sub-channels.

When using the MCM scheme, each subchannel may approximate to a flat channel due to a narrow bandwidth. A user may compensate for distortion of a channel using a simple equalizer. The MCM scheme may be implemented at a high speed using Fast Fourier Transform (FFT). Namely, the MCM scheme is favorable during high-rate data transmission as compared to the SCM scheme.

As the capabilities of a base station and/or a terminal have been developed, a frequency bandwidth which can be provided or used by the base station and/or the terminal has been enlarged. Accordingly, in the embodiments of the present invention, a multi-carrier system supporting broadband by aggregating one or more carriers is proposed.

Specifically, the multi-carrier system, which will be described hereafter, uses carriers by aggregating one or more carriers, unlike the afore-mentioned MCM scheme which uses carriers by segregating one carrier.

To efficiently use multiple bands or multiple carriers, a technique in which one medium access control (MAC) entity manages multiple carriers (e.g., multiple frequency carriers (FCs)) has been proposed.

FIGS. 1(a) and 1(b) illustrate methods for transmitting and receiving signals based on a multi-band radio frequency (RF) scheme.

In FIG. 1, one MAC layer in each of a transmitting end and a receiving end may manage multiple carriers to efficiently use the multiple carriers. To effectively transmit and receive the multiple carriers, it is assumed that both the transmitting end and the receiving end can transmit and receive the multiple carriers. Since frequency carriers managed by one MAC layer do not need to be contiguous, the above method enables flexible resource management. More specifically, the frequency carriers may have contiguous aggregation or non-contiguous aggregation.

In FIGS. 1(a) and 1(b), physical layers (PHY 0, PHY 1, . . . , PHY n−2, and PHY n−1) represent multiple bands and each of the bands may have a frequency carrier (FC) size allocated for a specific service according to a predetermined frequency policy. For example, PHY 0 (RF carrier 0) may have a frequency band size allocated for a general FM radio broadcast and PHY 1 (RF carrier 1) may have a frequency band size allocated for cellular phone communication.

Although each frequency band may have a different FA size depending on the characteristics thereof, it is assumed in the following description that each frequency carrier (FC) has a size of A MHz for convenience of explanation. Each frequency allocation (FA) band may be represented by a carrier frequency that enables a baseband signal to be used in each frequency band. Thus, in the following description, each FA will be referred to as a "carrier frequency band" or will simply be referred to as a "carrier" representing each carrier frequency band unless such use causes confusion.

As in the recent 3rd generation partnership project (3GPP) long term evolution-advanced (LTE-A), the carrier may also be referred to as a "component carrier" to discriminate it from a subcarrier used in the multi-carrier system.

As such, the "multi-band" scheme may also be referred to as a "multi-carrier" scheme or a "carrier aggregation" scheme.

FIG. 2 is a view illustrating an example of the use of multiple carriers in a general wireless communication system.

The multiple carriers of general technology may employ contiguous carrier aggregation as shown in FIG. 2(a) or non-contiguous carrier aggregation as shown in FIG. 2(b). The combination unit of such carriers is a basic bandwidth unit of a general legacy system (e.g., Long Term Evolution (LTE) in an LTE-advanced system or IEEE 802.16e in an IEEE 802.16m system).

In a multi-carrier environment of general technology, two types of carriers are defined as follows.

First, a first carrier (also called a primary carrier) is the carrier used by a Base Station (BS) and a Mobile Station (MS) to exchange traffic and full PHY/MAC control information. Further, the primary carrier is used for control functions for proper MS operation, such as network entry. Each MS shall have only one primary carrier per cell.

A second carrier (also called a secondary carrier) is an additional carrier which the terminal may use for traffic exchange, only per base station's specific allocation commands and rules, typically received on the primary carrier. The secondary carrier may also include control signaling to support multi-carrier operations.

In the general technology, the carriers of a multi-carrier system based on the above-described primary and secondary carriers may be classified into a fully configured carrier and a partially configured carrier.

First, the fully configured carrier is a carrier for which all control signaling actions are configured. Further, information and parameters regarding multi-carrier operations and the other carriers can also be included in the control channels.

The partially configured carrier is a carrier in which all control channels for supporting downlink (DL) transmission in a downlink carrier other than an uplink carrier, present as a pair with the downlink carrier, during Time Division Duplexing (TDD) DL transmission or in Frequency Division Duplexing (FDD) mode are configured.

Generally, a terminal may perform initial network entry through a primary carrier, and may exchange mutual multi-carrier capability information in a registration process for exchanging an Advanced Air Interface (AAI) registration request response (AAI_REG-REQ/RSP) message with a base station.

DISCLOSURE OF INVENTION

Solution to Problem

Therefore, an aspect of this specification is to provide a method for obviating a terminal from performing unnecessary scanning operations for the same assigned carrier by transmitting an indicator indicating whether or not to scan the assigned carriers to the terminal, in a multicarrier system.

Another aspect of this specification is to provide definition of a trigger condition for carrier management (as one example, secondary carrier activation/primary carrier change), and a method for transmitting the defined trigger conditions.

Another aspect of this specification is to provide a method for obviating failure of instruction given by a base station to activate a specific secondary carrier, by performing scanning for inactive assigned secondary carriers and transmitting the scan results to the base station.

To achieve these and other advantages and in accordance with the purpose of the present invention, as embodied and broadly described herein, there is provided a method for scanning assigned carriers in a multicarrier system including receiving a multicarrier advertisement message from a base station, the multicarrier advertisement message including scan reporting trigger control information of assigned secondary carriers, performing scanning for the assigned secondary carriers, and reporting the scan results to the base station when a specific metric measured by the scanning meets a condition set in the scan reporting trigger control information.

The scan results may be transmitted to the base station via a scan reporting (SCN-REP) message.

The specific metric may be a carrier to interference and noise ratio (CINR) or a received signal strength indicator (RSSI).

The assigned secondary carrier may be an inactive or active assigned secondary carrier.

The scan results may be reported to the base station when a metric measured by scanning the inactive assigned secondary carrier is greater than a threshold value or a metric measured by scanning the active assigned secondary carrier is less than a threshold value.

The scan reporting trigger control information may be a carrier activation (CA) specific trigger field indicating a trigger condition for reporting the scan results of inactive secondary carriers among the assigned secondary carriers to the base station.

The method may further include receiving a scan response (SCN-RSP) message from the base station, the scan response message instructing scanning for the assigned secondary carriers.

The scan response message may be transmitted from the base station when decided to activate an inactive secondary carrier is decided.

The method may further include receiving a carrier management command (CM-CMD) message from the base station, the carrier management command message instructing activation and/or deactivation of the secondary carriers.

The method may further include receiving a first message from the base station, the first message including a scanning required indicator indicating whether or not to scan the assigned secondary carriers.

The scanning required indicator may be 1-bit in size.

The first message may be one of a multicarrier response (MC-RSP) message, a multi-carrier advertisement (MC-ADV) message, or a neighbor advertisement (NBR-ADV) message.

Whether or not to scan may be decided based upon coverage of the assigned secondary carrier.

In accordance with an exemplary embodiment, there is provided a terminal for scanning assigned carriers in a multicarrier system, the terminal including a radio frequency unit configured to transmit and receive radio signals to and from an exterior, and a controller configured to control the radio frequency unit to receive a multi-carrier advertisement message from a base station, the multicarrier advertisement message including scan reporting trigger control information of assigned secondary carriers, to perform scanning for the assigned secondary carriers, and to control the radio frequency unit to report the scan results to the base station when a specific metric measured by the scanning meets a condition set in the scan reporting trigger control information.

The controller may control the radio frequency unit to report the scan results to the base station when a metric measured by scanning the inactive assigned secondary carrier is greater than a threshold value or a metric measured by scanning the active assigned secondary carrier is less than a threshold value.

The controller may control the radio frequency unit to receive a scan response (SCN-RSP) message instructing scanning for an assigned secondary carrier from the base station.

Advantageous Effects of Invention

This specification has an effect that a terminal may not perform unnecessary scanning for assigned carriers, which have the same coverage, by transmitting an indicator indicating whether or not to scan assigned carriers to the terminal in a multi-carrier system.

This specification also has an effect of obviating failure of instruction given by a base station to activate a specific secondary carrier by performing scanning for inactive assigned secondary carriers and transmitting the scan results to the base station.

BRIEF DESCRIPTION OF DRAWINGS

FIGS. 1 (a) and (b) illustrate a method for transmitting and receiving a signal based on a multi-band radio frequency (RF) scheme;

FIGS. 2 (a) and (b) are a view illustrating an example of the use of multiple carriers in a general wireless communication system;

FIG. 3 is a view illustrating an exemplary procedure for allowing a base station to allocate (assign) one or more carriers to a terminal via a carrier management message (AAI_CM-CMD) in a broadband wireless access system;

FIG. 4(a) illustrates that multiple carriers belonging to an arbitrary base station have the same coverage, and FIG. 4(b) illustrates that multiple carriers belonging to an arbitrary base station have different coverage from each other;

FIG. 5 is flowchart illustrating a scanning method using a scanning required indicator in accordance with a first exemplary embodiment;

FIG. 6 is a flowchart illustrating a scanning method using a scanning required indicator and a carrier activation (CA) specific trigger condition in accordance with another exemplary embodiment;

FIG. 7 illustrates trigger values for scanning and scan reporting when a terminal moves toward a center of a cell according to a trigger condition 1 of the second exemplary embodiment;

FIG. 8 illustrates trigger values for scanning and scan reporting when a terminal moves away from a center of a cell according to a trigger condition 2 of the second exemplary embodiment;

MODE FOR THE INVENTION

Figure 9:
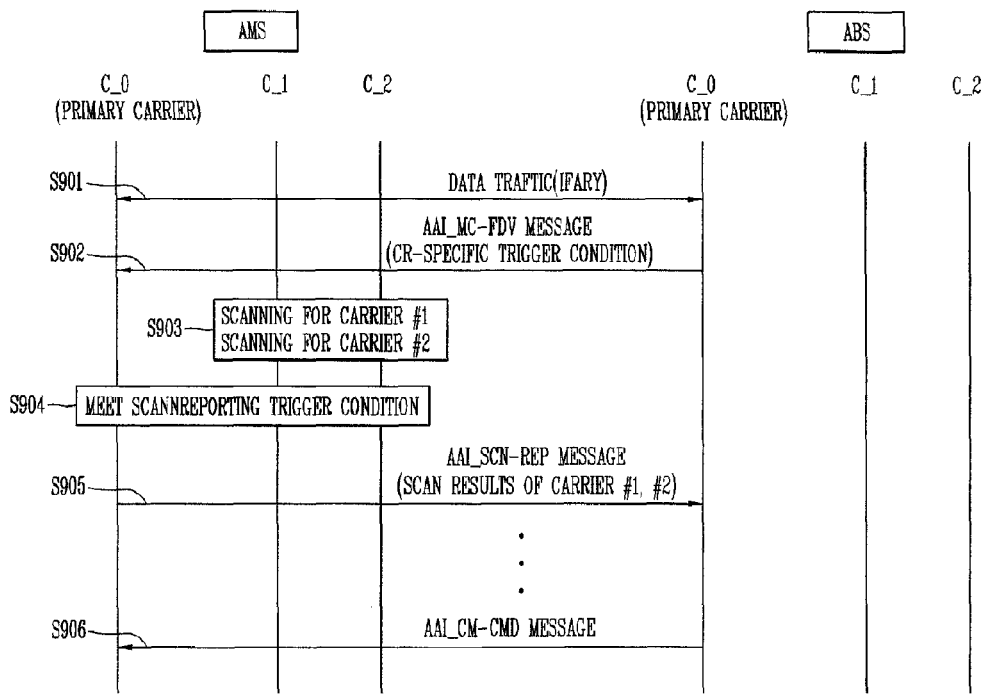
FIG. 9 is a flowchart illustrating a method for reporting scan results of assigned secondary carriers according to a multicarrier (MC)-specific trigger conditions in accordance with a third exemplary embodiment.

Reference will now be made in detail to the preferred embodiments of this specification, examples of which are illustrated in the accompanying drawings. It should be understood that the description herein will be given of essential parts required to understand operations according to this specification and description of the other parts will be omitted to obviate obscurity of the point of the invention.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions of another embodiment.

In exemplary embodiments of the present invention, description is made of a data transmission and reception relationship between a base station (BS) and a Mobile Station (MS). Herein, the term 'BS' refers to a terminal node of a network, which communicates directly with the MS. In some cases, a specific operation described as performed by the BS may be performed by an upper node of the BS.

Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'eNode B (eNB)', 'access point', 'advanced base station (ABS),' etc. The term 'MS' may be replaced with the term 'User Equipment (UE)', 'Subscriber Station (SS')', 'Mobile Subscriber Station (MSS)', 'mobile terminal', 'advanced mobile station (AMS),' etc.

Exemplary embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the exemplary embodiments of the present invention may be implemented in the form of a module, a procedure, a function, etc. performing the above-described functions or operations. Software code may be stored in a memory unit and executed by a processor. The memory unit is located at the interior or exterior of the processor and may transmit and receive data to and from the processor via various known means.

Specific terms used for the exemplary embodiments of the present invention are provided to help in understanding of the present invention. These specific terms may be replaced with other terms within the scope and spirit of the present invention.

Multicarrier Operation Mode

1. Multicarrier Aggregation

Multicarrier aggregation is a multicarrier mode in which a physical layer connection of an AMS is maintained while the AMS executes data transmission via a secondary carrier, and control signaling is monitored via a primary carrier.

2. Multicarrier Switching

Multicarrier switching is a multicarrier mode in which a physical layer connection of an AMS is switched from a primary carrier to a fully configured or partially configured secondary carrier by a base station (ABS)'s instruction to receive E-MBS service via the secondary carrier.

3. Basic MC Mode

Basic Multicarrier (MC) mode is a mode in which a terminal operates with only a single carrier although it supports a primary carrier switching procedure as well as an optimized scanning of carriers related to a multicarrier operation.

Hereinafter, terms to be used in the multicarrier operation will be defined.

1. Available Carrier: The available carrier refers to all carriers belonging to the base station (ABS). The terminal may acquire information of the available carrier through an advanced air interface global carrier configuration (AAI_Global-config) message or a multicarrier advertisement (AAI_MC-ADV) message.

2. Assigned Carrier: The assigned carrier refers to a subset of an available carrier that is assigned to the AMS by the ABS. That is, the ABS may assign at least one of its own available carriers as an assigned secondary carrier of the AMS in consideration of the AMS capability.

3. Active Carrier: The active carrier refers to a carrier that is ready to perform data exchange between the AMS and the ABS, and may be a subset of the assigned carrier. Activation/deactivation of the assigned secondary carrier may be dependent upon the decision of the ABS based on a Quality of Service (QoS) request. The ABS may inform the AMS of information of whether to activate or deactivate a specific secondary carrier through a carrier management command (AAI_CM-CMD) message.

Hereinafter, based on the above mentioned description, a procedure for allowing the base station to assign a carrier to the terminal with reference to FIG. 3.

FIG. 3 is a view illustrating an exemplary procedure for allowing a base station (advanced base station; ABS) to assign at least one carrier to a terminal (advanced mobile station; AMS) via a carrier management command (AAI_CM-CMD) message in a broadband wireless access system.

As illustrated in FIG. 3, the AMS may perform an initial network entry including processes, such as scanning, ranging and the like, with the ABS (S301).

The AMS and the ABS may exchange information related to multicarrier capabilities with each other via registration request/response (AAI_REG-REQ/RSP) messages (S302 and S303).

The ABS may transmit the AAI_REG-RSP message and transmit a global carrier configuration (AAI_Global-config) message (S304). The AAI_Global-config message may include information related to all the available carriers supported in a network.

Also, the AMS may acquire information related to multicarrier configuration of the ABS by receiving a multicarrier advertisement (AAI_MC-ADV) message, which is periodically broadcast from the ABS (S305).

Afterwards, the AMS may inform the ABS of information about the AMS's supportable carriers through a multicarrier request (AAI_MC-REQ) message according to multicarrier configurations of the ABS's available carriers using the acquired information, such that it can request the list of assigned carriers from the ABS.

The ABS may then decide a subset, which will be assigned as the AMS's secondary carrier, from among the ABS's available carriers on the basis of information received from the AMS, decide the list of assigned carriers, and inform the AMS of the decided list of assigned carriers through a multicarrier response (AAI_MC-RSP) message (S307).

Thereafter, the ABS may transmit a carrier management command (AAI_CM-CMD) message to the AMS according to the decision based on the QoS request, such that it determines whether to activate or deactivate the assigned carrier given to the AMS.

Hereinafter, this specification proposes a method for obviating an unnecessary scanning operation of an AMS, which performs communication with an ABS using multiple carriers, and obviating failure of a carrier activation instruction of the ABS through a channel state measurement for inactive carriers among secondary carriers assigned from the ABS.

First Exemplary Embodiment

The first exemplary embodiment illustrates a method for transmitting a scanning required indicator to an AMS to indicate whether or not to scan a secondary carrier(s) assigned from an ABS (i.e., assigned secondary carrier(s)) to obviate the AMS from executing an unnecessary scanning.

First, in the related art multicarrier operation, scanning for an assigned carrier from a serving ABS is performed by the ABS's instruction (AAI_SCN-RSP) or voluntarily by the AMS. Here, when the AMS voluntarily performs the scanning for the assigned carrier, reporting for the scan results, may be performed only when the ABS's instruction is received.

However, for the following cells in which multiple carriers are arranged, the AMS may unnecessarily perform scanning:
1. when multiple carriers belonging to an arbitrary ABS have the same coverage
2. when multiple carriers belonging to an arbitrary ABS have different coverage.

FIG. 4(a) illustrates that multiple carriers belonging to an arbitrary ABS have the same coverage, and FIG. 4(b) illustrates that multiple carriers belonging to an arbitrary ABS have different coverage.

First, as illustrated in FIG. 4(a), when all the carriers belonging to an arbitrary ABS have the same coverage, the AMS does not have to perform scanning for measuring channel state information related to an assigned carrier. However, the related art method allows the AMS to voluntarily perform scanning for a certain carrier, accordingly, unnecessary scanning for carriers with the same coverage is performed.

As illustrated in FIG. 4(b), when assigned secondary carriers assigned from the ABS have different coverage when the AMS performs a network (re)entry, the ABS may not recognize where the AMS is exactly located and fail to know a channel state(s) of an inactive carrier(s), which causes the ABS to instruct activation of a certain inactive carrier. In this case, if the corresponding carrier has smaller coverage than the existing active carriers and the AMS is in the outside of the carrier whose activation is instructed by the ABS, the ABS's activation for the corresponding carrier may be failed.

Therefore, downlink (DL) carrier channel state information, such as carrier to interference and noise ratio (CINR) for a secondary carrier may be measured for inactive carriers as well as active carriers, and the measurement results needs to be transmitted to the ABS.

Definition of Scanning Required Indicator

Scanning required indicator or scanning required indication field is transmitted from ABS to AMS to indicate whether to scan a carrier (voluntarily by the AMS) or not when the corresponding carrier is used as a secondary carrier and the corresponding carrier is inactive. Also, the scanning required indicator may be 1-bit in size for each carrier.

Also, the scanning required indicator may be transmitted when the ABS assigns assigned secondary carriers to the AMS. As one example, the scanning required indicator may be transmitted to the AMS via the AAI_MC-RSP message.

Here, the base station may decide whether to scan the assigned secondary carrier or not on the basis of the coverage of each carrier. The coverage of each carrier is information that the ABS already knows, so the ABS can inform the AMS of the scanning or non-scanning with reference to the coverage value.

The ABS may select a carrier, which has been informed via the scanning required indicator as a carrier for which scanning is not required, as a target carrier of a carrier management without request for scan reporting from the AMS. Here, the carrier management may be a carrier activation, a carrier deactivation, a primary carrier change or the like.

The base station may recognize channel state (carrier to interference and noise ratio (CINR), received signal strength indicator (RSSI), round trip delay (RTD), etc.) information related to the assigned secondary carrier, which has been informed via the scanning required indicator as a carrier for which scanning is not required, based on channel state information related to a primary carrier. That is, the ABS may consider the channel state information related to an assigned secondary carrier, informed as a scanning-unnecessary carrier, as the same as the channel state information related to the primary carrier.

Transmission of Scanning Required Indicator

Hereinafter, description will be made to an exemplary format of MC-RSP message, MC-ADV message or NBR-ADV message each including the scanning required indicator defined in the first exemplary embodiment.

(1) Transmission Via AAI_MC-RSP Message

The following Table 1 shows an example that the scanning required indicator is included in AAI_MC-RSP message.

TABLE 1

| Field | Size(bit) | Description |
| --- | --- | --- |
| Control Message Type | 8 | AAI_MC-RSP message |
| Global_Assign | 1 | Indicates whether the ABS assigns all the carriers requested by AMS through AAI_MC-REQ<br>0b0: The ABS assigns a subset of the carriers requested by AMS<br>0b1: The ABS assigns all the carriers requested by AMS |
| If(Global_Assign == 0){ | | |
|   Number of Assigned Carriers (N) | 4 | |
|   For (i=0; i<N; i++){ | | |
|     Physical Carrier Index | 6 | The carriers AMS can simultaneously support |
|     Scanning required indicator | 1 | Indicates whether the assigned carrier needs to perform the scanning for carrier management when the carrier is inactive.<br>0b0: The AMS may perform scanning for the corresponding carrier.<br>0b1: The AMS shall not (or doesn't need to) perform scanning for the corresponding carrier without any direction from ABS. |
|   } | | |
| } | | |
| Support of data transmission over guard sub-carrier | 1 | 0 = not support<br>1 = support |

Referring to Table 1, the scanning required indicator field indicates whether to perform scanning for carrier management when a corresponding carrier is inactive. As one example, when the scanning required indicator field is set to '0b0,' the AMS performs scanning for the corresponding carrier. When set to '0b1', the AMS shall not perform scanning for the corresponding carrier without any direction from the ABS.

The following Table 2 shows an example that a carrier activation-specific (CA-specific) trigger condition field is included in MC-RSP message when the scanning required indicator is set to '0b1.'

TABLE 2

| Field | Size (bit) | Note |
| --- | --- | --- |
| Global_Assign | 1 | Indicates whether the ABS assigns all the carriers requested by AMS through AAI_MC-REQ<br>0b0: The ABS assigns a subset of the carriers requested by AMS<br>0b1: The ABS assigns all the carriers requested by AMS |
| If(Global_Assign == 0) { | | |
| Number of Assigned Carriers (N) | 3 | Number of assigned secondary carriers. |
| For (i=0; i<N; i++){ | | |
| Physical carrier index | 6 | The index refers to a physical carrier index in AAI_MC-ADV message. Logical carrier index is assigned implicitly in the order of assigned physical carrier index. |
| Scanning required indicator | 1 | 0: The AMS does not need to perform scanning when the carrier is inactive.<br>1: The AMS may perform scanning without any direction from ABS when the carrier is inactive. |
| If (scanning required indicator ==1){ | | |
| CM-specific Trigger TLVs | Variables | CM-specific triggers with encoding defined in Table 9-12 Trigger description for assigned carriers. |
| } | | |
| } | | |
| } | | |
| Support of data transmission over guard sub-carrier | 1 | 0 = not support<br>1 = support |

The following Table 3 shows an example that CA-specific trigger condition field is included in MC-RSP message when the scanning required indicator is set to '0b1.'

TABLE 3

| M/0 | Attributes/Array of attributes | Size (bit) | Value/Note | Conditions |
|---|---|---|---|---|
| M | Global Assign | 1 | Indicates whether the ABS assigns all the carriers requested by AMS through AAI_MC-REQ<br>0b0: The ABS assigns a subset of the carriers requested by AMS<br>0b1: The ABS assigns all the carriers requested by AMS | |
| 0 | Number of assigned carriers | 3 | Indicates the number of carriers to be assigned to the MS | Shall be present when the Global Assign is zero |
| 0 | Physical carrier index | 6 | Indicates the carriers to be assigned to the MS. Logical carrier index is assigned implicitly in the order of assigned physical carrier index | Shall be present when the Global Assign is zero |
| 0 | Scanning required indicator | 1 | Indicates whether the AMS needs to perform the scanning the scanning procedure for the assigned carrier when the carrier is inactive.<br>0: the AMS doesn't need to perform scanning.<br>1: The AMS may perform scanning without any direction from ABS. | Shall be present when the Global Assign is zero |
| 0 | CM-specific Trigger TLVs | Variables | CM-specific triggers with encoding defined in Table 9-12 Trigger description for assigned carriers | Shall be present when the scanning required indicator is set to 1. |
| M | Support of data transmission over guard sub-carrier | 1 | Indicates the support of guard carrier for data<br>0b0: not supported<br>0b1: supported | |

(2) Transmission Via AAI_MC-ADV Message

The following Table 4 shows an example that the scanning required indicator is included in AAI_MC-ADV message.

TABLE 4

| Field | Size(bit) | Description |
|---|---|---|
| MAC control Message Type | 8 | |
| Multi-carrier configuration change count | 4 | Incremented by 1 upon each update |
| Serving BS Carrier Number | 3 | |
| Serving BS Uniformity Flag | 1 | 0: All Carriers supported by serving ABS have the same Protocol Version, SFH_Info<br>1: otherwise |
| Physical Carrier Index of current carrier | 6 | The carrier that ABS broadcast this message; the physical carrier index refers to AAI_Global-Config message |
| MAC Protocol version | 8 | Consistent with REV. 2 definition, with new MAC protocol version 9 defined for 16 m |
| For(i=1;i<=Serving BS Carrier Number−1; i++){ | | |
| Physical carrier index | | |
| Paging carrier indication | | |
| SA-Preamble Index | | |
|     Scanning required indicator | 1 | Indicates whether the assigned carrier needs to perform the scanning for carrier management when the carrier is inactive.<br>0b0: The AMS may perform scanning for the corresponding carrier.<br>0b1: The AMS shall not (or doesn't need to) perform scanning for the corresponding carrier without any direction from ABS. |
| if (Serving BS Uniformity Flag==1) { | | |
|     omitted | | Protocol version, SFH information for neighbor ABS |
| } | | |

(3) Transmission Via Neighbor Advertisement (AAI_NBR-ADV) Message

The following Table 5 shows an example that the scanning required indicator is included in AAI_NBR-ADV message.

TABLE 5

| M/O | Attributes/Array of attributes | Size(bit) | Value/Note | Conditions |
|---|---|---|---|---|
| M | Change Count | 3 | NBR-ADV Change Coutn | N.A. |
| M | Cell Type | 3 | Cell type in this message 0b000: macro, 0b001: micro, 0b010: macro hotzone, 0b011: femto, 0b100: relay, 0b10-0b111: reserved | N.A. |
| M | Total Number of AAI_NBR-ABV Segments | 4 | Total number of segments of AAI_NBR-ADV for this cell type. | N.A. |
| M | AAI_NBR-ADV Segment Index | 4 | Indicates current segment index of this message in the specific cell type. | N.A. |
| M | BS number M | 8 | Total number of BSs to be included in this AAI_NBR-ADV segment . . . omitted . . . | N.A. |
| O | Delta information | Var. | Delta encoding, w.r.t. the reference carrier the current carrier transmitting this message if SFH_encoding format = 01, the preceding carrier if SFH_encoding_format= 11) | Shall be included for each neighbor BS if SFH_cncoding_format is set to 0b01 or 0b11 |
| O | Neighbor-specific trigger | Var. | Optional neighbor-specific triggers with encoding defined in Trigger description | May be included for each neighbor BS |
| O | Scanning required indicator | 1 | Indicates whether the carrier needs to perform the scanning for carrier management when the carrier is inactive. 0b0: The AMS may perform scanning for the corresponding carrier. 0b1: The AMS shall not (or doesn't need to) perform scanning for the corresponding carrier without any direction from ABS. . . . following fields omitted . . . | May be included for each neighbor BS |

FIG. 5 is flowchart illustrating a method for performing a scanning operation using a scanning required indicator in accordance with a first exemplary embodiment.

As illustrated in FIG. 5, an ABS may transmit a message including a scanning required indicator indicating whether to scan a specific carrier or not to an AMS (S501).

Here, the message, as aforementioned, may be MC-RSP message, MC-ADV message or NBR-ADV message.

When the scanning required indicator is transmitted via the MC-RSP message, it is included in the MC-RSP message together with an assigned secondary carrier to be sent to the AMS when the ABS assigns the corresponding assigned secondary carrier to the AMS.

The scanning required indicator or scanning required indication field may be transmitted by being included in the message when the specific carrier is used as a secondary carrier and the corresponding carrier is inactive. Also, the scanning required indicator may be 1-bit in size for each carrier.

Afterwards, the AMS may perform scanning only for a carrier whose scanning required indicator is set to '0b1' (S502).

The AMS may then report the scan results to the ABS (S503). Here, the scan results may be transmitted to the ABS via a scan report message.

FIG. 6 is a flowchart illustrating a method for performing scanning using a scanning required indicator and carrier activation-specific (CA-specific) trigger condition as another example according to the first exemplary embodiment.

As illustrated in FIG. 6, an ABS may transmit to an AMS a scanning required indicator indicating whether to scan a specific carrier or not and a CA-specific trigger condition (S601).

Here, the CA-specific trigger condition may be transmitted to the AMS by being included in the message when the scanning required indicator is set to '0b1.' Here, the message, as aforementioned, may be MC-RSP message, MC-ADV message or NBR-ADV message.

When a metric of channel state information (CINR, RSSI, RTD) measured from the carrier having the scanning required indicator set to '0b1' satisfies a scanning initiation condition of the CA-specific trigger condition (S602), then the AMS may perform scanning for the corresponding carrier (S603).

Afterwards, when the scan results satisfy a scan reporting condition of a multicarrier-specific (MC-specific) trigger condition and accordingly the AMS triggers the scan reporting to the ABS (S604), the AMS may transmit a scan reporting (SCN-REP) message to the ABS by including carrier to interference and noise ratio (CINR), received signal strength indicator (RSSI), round trip delay (RTD) and the like, which are measured through the scanning (i.e., the scan results) (S605).

Second Exemplary Embodiment

The second exemplary embodiment illustrates a method for informing whether to scan a corresponding carrier according to presence or non-presence of the same value as a newly defined multicarrier-specific (MC-specific) trigger when a trigger condition (e.g., the MC-specific trigger) for carrier management is newly defined.

That is, in the second exemplary embodiment, in case where a trigger condition for carrier management is newly defined (e.g., MC-specific trigger or CA-specific trigger) and the defined value is transmitted via a broadcast message, such as AAI_MC-ADV or AAI_NBR-ADV, for a carrier for which scanning can be skipped due to having the same coverage as a reference carrier (or with other various reasons), whether to scan the corresponding carrier or not may be informed according to presence or non-presence of the same value as the MC-specific trigger to be transmitted via the broadcast message.

Here, the reference carrier may be the first carrier in AAI_MC-ADV message or AAI_NBR-ADV message.

Hereinafter, trigger conditions defined for the carrier management (secondary carrier activation) will be described.

1. Scanning Trigger Condition for Secondary Carrier Activation

A scanning trigger condition proposed in this specification is whether or not a corresponding inactive carrier is receivable from the current perspective of an AMS.

That is, such trigger condition is required only for a carrier having smaller coverage than a primary carrier because a zone of a carrier having larger coverage generally includes a zone of a carrier having smaller coverage.

(1) Trigger Condition 1

As described above, availability of a carrier having small coverage increases as an AMS moves toward the center of a cell. That is, a case where a value, such as power, SINR (or CINR), RSSI or the like, of a primary carrier is more than a specific value may be considered as the most easily useable trigger condition.

The ABS already knows coverage information about each of the two carriers, so it may inform the AMS to initiate scanning when a specific value is more than a preset value based on the primary carrier. Since this value should be decided from the perspective of the ABS irrespective of a receiver capability, values such as signal power or RSSI may be used for trigger.

When a corresponding trigger value meets a trigger condition of a specific secondary carrier as the AMS enters the center of the cell, scanning for the corresponding secondary carrier may be initiated.

(2) Trigger Condition 2

On the contrary, even when the AMS moves from an available zone into a non-available zone, if the corresponding trigger value becomes less than a specific value, scanning may be initiated.

2. Scan Reporting Trigger Condition for Secondary Carrier Activation

When scanning is initiated according to the trigger condition 1, when the scanned value is greater than a specific value, the AMS may report this information to the ABS so as to inform the ABS of whether or not the current carrier is available.

On the contrary, when scanning is initiated according to the trigger condition 2, if the scanned value is less than the specific value, the AMS may report the information to the ABS so as to inform the ABS of whether the current carrier is available. The AMS may report the scan results to the ABS periodically or one time under a satisfactory situation.

Whether to be available/non-available may be decided based on a common value (e.g., RSSI, signal power) or the like, or be affected by the number of reception antennas of the AMS, receiver capability or the like due to being a value related to actual transmission and reception. Here, whether to be available/non-available may thusly be decided based upon an actual reception capability by using a value of SINR, CINR or the like.

If decided based on the reception capability, the same trigger condition value may be used for every carrier in a whole cell. In this case, overhead due to a trigger condition transmission may be reduced.

Hence, the ABS may check whether or not a specific secondary carrier can be activated based upon the AMS's reporting.

Also, in a deactivation of a specific secondary carrier, whether to be available may be checked based on feedback such as CQI of an active carrier or the like.

When the AMS reports the scan results to the ABS one time, the reporting of the scan results may be a scanning release condition.

Consequently, each carrier may require two trigger conditions and also two report conditions. The report condition may be defined by two for each network, or instead of defining two report conditions, a center value may be defined and then two report conditions may be inferred by increasing (+) or decreasing (−) a predetermined margin.

FIG. 7 illustrates trigger values for scanning and scan reporting according to power of a primary carrier and SINR of a secondary carrier when an AMS moves toward the center of a cell under the trigger condition 2 of the second exemplary embodiment.

FIG. 8 illustrates trigger values for scanning and reporting according to power of a primary carrier and SINR of a secondary carrier when an AMS moves away from the center of a cell under the trigger condition 1 of the second exemplary embodiment.

The following Table 6 shows an example that a multicarrier-specific (MC-specific) trigger field for carrier management is included in AAI_NBR-ADV message.

TABLE 6

| M/O | Attributes/Array of attributes | Size(bit) | Value/Note | Conditions |
|---|---|---|---|---|
| M | Change Count | 3 | NBR-ADV Change Coutn | N.A. |
| M | Cell Type | 3 | Cell type in this message 0b000: macro, 0b001: micro, 0b010: macro hotzone, 0b011: femto, 0b000: relay, 0b101-0b111: reserved | N.A. |
| M | Total Number of AAI_NBR-ADV Segments | 4 | Total nunmber of segments of AAI_NBR-ADV for this cell type. | N.A. |
| M | AAI_NBR-ADV Segment Index | 4 | Indicates current segment index of this message in the specific cell type. | N.A. |
| M | BS number M | 8 | Total number of BSs to be included in this AAI_NBR-ADV segment | N.A. |
| | | | . . . omitted . . . | |
| O | Delta information | Var. | Delta encoding, w.r.t. the reference carrier the current carrier transmitting this message if SFH_encoding format = 01, the preceding carrier if SFH_encoding_format = 11) | Shall be included for each neighbor BS if SFH_encoding_format is set to 0b01 or 0b11 |
| O | Neighbor-specific trigger | Var. | Optional neighbor-specific triggers with encoding defined in Trigger description | May be included for each neighbor BS |
| O | MC-specific trigger | Var. | MC-specific triggers with encoding defined in Table 9-12 Trigger description for assigned carriers If MC-specific trigger is transmitted for a carrier, the AMS shall perform any action triggered by the encoding. Else, the AMS doesn't need to perform any action for this carrier and refers to the measurement results of the reference carrier (i.e., previous carrier). | May be included for available carriers of each neighbor BS. |
| | | | . . . following fields omitted . . . | |

Referring to Table 6, the MC-specific trigger field refers to an MC-specific trigger with encoding defined in Tables 9-12 showing trigger conditions for assigned carriers.

If the MC-specific trigger is transmitted to the AMS for a specific carrier, the AMS may perform a certain action triggered by the encoding. Else, the AMS does not need to perform a specific action for the carrier and may refer to the measurement results of the reference carrier (e.g., previous carrier).

The following Table 7 shows an example that an MC-specific trigger field for carrier management is included in AAI_MC-ADV message.

carrier management. This causes a delay of a carrier management related procedure, which may be performed for a multicarrier operation.

Also, as described above, if the ABS voluntarily instructs a carrier management (e.g., activation of assigned secondary carrier) with respect to the AMS without requesting scanning from the AMS, a target carrier is randomly selected in a state of a channel state of the target carrier being unknown. Accordingly, when the channel state of the target carrier is bad, a carrier management failure or inefficient carrier management may be caused.

Hereinafter, description will be made in detail to the method of defining a trigger condition for carrier manage-

TABLE 7

| Field | Size(bit) | Description |
| --- | --- | --- |
| MAC control Message Type | 8 | |
| Multi-carrier configuration change count | 4 | Incremented by 1 upon each update |
| Serving BS Carrier Number | 3 | |
| Serving BS Uniformity Flag | 1 | 0: All Carriers supported by serving ABS have the same Protocol Version, SFH_Info<br>1: otherwise |
| Physical Carrier Index of current carrier | 6 | The carrier that ABS broadcast this message; the physical carrier index refers to AAI_Global-Config message |
| MAC Protocol version | 8 | Consistent with REV. 2 definition, with new MAC protocol version 9 defined for 16 m |
| For(i=1;i<=Serving BS Carrier Number−1; i++){<br>Physical carrier index<br>Paging carrier indication<br>SA-Preamble Index<br>If (Same coverage as reference carrier!){ | | |
| MC-specific Trigger TLV | variables | MC-specific triggers with encoding defined in Table 9-12 Trigger description for assigned carriers<br>If MC-specific trigger is transmitted for a carrier, the AMS shall perform the action triggered by this encoding. Else, the AMS doesn't need to perform any action for this carrier and just refers to the measurement results of the reference carrier (i.e., previous carrier) |
| }<br>if(Serving BS Uniformity Flag==1) {<br>    omitted<br>} | | Protocol version, SFH information for neighbor ABS |

Third Exemplary Embodiment

The third exemplary embodiment illustrates a method for defining a trigger condition for carrier management (e.g., secondary carrier activation or primary carrier change) and transmitting a message including the defined trigger condition.

First, prior to the method proposed in the third exemplary embodiment, it is allowed to define a trigger condition for measuring a channel state of a specific carrier of a neighbor ABS for performing handover (HO) via AAI_SCD message.

However, the previous method defines scanning for a carrier belonging to a serving ABS (serving cell) to be performable through SCN-REQ/RSP/REP message processes according to the ABS's direction, but does not separately define a trigger condition for scanning for multiple secondary carriers.

That is, regarding the related scanning operation, even if the AMS recognizes based on a specific metric that a channel state of a target carrier becomes better, a channel state measurement for the corresponding carrier may not be performed.

Furthermore, even if scanning is performed, the AMS reports the scan results (i.e., transmits SCN-REP) to the ABS only when receiving SCN-RSP from the ABS. That is, the channel state information related to any carrier within a cell is transmitted by the AMS only in response to the ABS's request.

Here, when a carrier management with respect to the AMS is required, the ABS requests scanning from the AMS, receives the scan result from the AMS, and performs the ment (e.g., secondary carrier activation) and transmitting the defined trigger condition in accordance with the third exemplary embodiment.

1. Scanning for Assigned Carriers by AMS

A scanning operation may provide the AMS with an opportunity of measuring assigned carriers for carrier management (e.g., secondary carrier activation or primary carrier change) and acquiring necessary system configuration information.

When the AMS has a multicarrier aggregation capability, the AMS may perform measurement for assigned carriers without a time interval specific for scanning.

The ABS may clarify trigger parameter values based on target carriers within a SCD message (or MC-ADV message, NBR-ADV message, SFH or MC-RSP message). Also, the ABS may clarify a (fully configured or partially configured) form of a target carrier, which the AMS is to scan, and/or averaging parameters, which are obtained by overriding values defined in the SCD message.

Here, a trigger condition used for carrier management, unlike a trigger condition used for handover (HO), may be information, which the AMS should receive as soon as possible after a network reentry. Therefore, the trigger condition used for the carrier management may preferably be transmitted via a different message or a superframe header (SFH), other than transmitted via AAI_SCD message.

If a trigger condition defined for carrier management is transmitted via AAI_SCD (or SHF, AAI_MC-ADV) message and information related to AAI_SCD message of a neighbor ABS is different from AAI_SCD information of a serving ABS, the AAI_SCD information of the neighbor ABS may preferably be transmitted via AAI_NBR-ADV.

If assigned secondary carriers assigned from the base station cannot be simultaneously scanned due to the limitation to the AMS capability, the AMS should receive a time interval assigned from the base station. In this case, the scanning procedure for the assigned carriers may be performed by the AMS as follows.

When the ABS is unable to simultaneously perform a channel state measurement for an assigned carrier and an active carrier due to the limitation to the AMS capability, the ABS may assign a time interval to the AMS such that the AMS monitors other carriers.

2. Definition of Trigger Condition for Assigned Carrier (1) Conditions defined when AMS starts scanning (2) Conditions defined when AMS reports scan results to serving ABS (3) Conditions defined when AMS attempts to initiate a primary carrier change by transmitting a carrier management request message Upon defined such that the AMS initiates a carrier management (e.g., a secondary carrier management or a primary carrier change), the AMS may transmit a carrier management request (AAI_CM-REQ) message for a carrier management process request to the ABS, and the carrier management request message may allow the ABS to transmit a carrier management command (AAI_CM-CMD) message.

(4) Conditions defined when a target carrier is unreachable (5) Conditions defined when AMS is unable to maintain communication with the current active carrier (6) Conditions for carrier management cancellation Definition of MC-Specific Trigger Condition (or CA-Specific Trigger Condition)

A handover (HO)-related trigger condition for performing the HO is transmitted from the ABS to the AMS via a system configuration descript (SCD) message.

Here, when the ABS transmits an MC-specific trigger condition or CA-specific trigger condition to the AMS via AAI_SCD message, such trigger condition may be defined as a different condition from the HO-related trigger condition.

To distinguish the MC-specific trigger condition from the HO-related trigger condition, the MC-specific trigger condition may be transmitted via AAI_MC-ADV message, AAI_NBR-ADV message, AAI_MC-RSP message or SFH, as well as via the SCD message.

The MC-specific trigger condition may be defined to be ABS-specific, carrier-specific or network-specific.

First, the following Table 8 shows an example of items included in MC-specific trigger control information (condition).

TABLE 8

| Name | Length (bits) | Value |
|---|---|---|
| Number of conditions | 2 | The number of conditions that are included in this trigger (see loop definition below). When more than one condition is included, this trigger is referred to as a complex trigger and is the logical AND combination of all the included conditions. |
| For(i=0; i<=Number of conditions; i++){ | | |
| Type/Function/Action | 5 | See following Table 9-12 for description |
| Trigger value | 8 | Trigger value is the value used in comparing measured metric for determining a trigger condition. |
| Trigger averaging parameter | 4 | The averaging parameter used for averaging this trigger metric according to equation (1) for target ABS (which is defined in ABS type). If not present, the default trigger averaging parameter in AAI_SCD is used.<br>0x0: 1<br>0x1: ½<br>0x2: ¼<br>0x3: ⅛<br>0x4: 1/16<br>0x5: 1/32<br>0x6: 1/64<br>0x7: 1/128<br>0x8: 1/256<br>0x9: 1/512<br>0xA to 0xF: reserved |
| } | | |

The following Table 9 shows an example of Type/Function/Action item of the items included in the MC-specific trigger control information of Table 8.

TABLE 9

| Name | Size (bits) | Value | Description |
|---|---|---|---|
| Type | 2(MSB) | Trigger metric type:<br>0x0: CINR metric<br>0x1: RSSI metric<br>0x2: RTD metric<br>0x3: reserved | |

TABLE 9-continued

| Name | Size (bits) | Value | Description |
|---|---|---|---|
| Function | 2 | Computation defining scanning and reporting trigger condition:<br>0x0: Metric of primary carrier is greater than absolute value<br>0x1: Metric of primary carrier is less than absolute value<br>0x2: Metric of secondary carrier is greater than absolute value<br>0x3: Metric of secondary carrier is less than absolute value | |
| Action | 1(LSB) | Action performed upon reaching trigger condition:<br>0b0: Initiate the scanning<br>0b1: Respond on trigger with AAI_SCN-REP | Action 0b0 applies to only Function 0x0 and 0x1, and action 0b1 applies to only Function 0x2 and 0x3. |

The following Table 10 shows another example of Type/Function/Action item of the items included in the MC-specific trigger control information of Table 8.

TABLE 10

| Name | Size(bit) | Value |
|---|---|---|
| Type | TBD (MSB) | Trigger metric type:<br>0x0: CINR metric, 0x1: RSSI metric, 0x2: RTD metric,<br>0x3: Metirc = number of consecutive P-SFHs missed, 0x4: RD metric, 0x5~0x7: reserved |
| Function | TBD | Computation defining trigger condition:<br>0x0: Reserved<br>0x1: Metric of assigned carrier is greater than absolute value<br>0x2: Metric of assigned carrier is less than absolute value<br>0x3: Metric of assigned carrier is greater than primary carrier metric by relative value<br>0x4: Metric of assigned carrier is less than primary carrier metric by relative value<br>0x5: Metric of active (or primary) carrier greater than absolute value<br>0x6: Metric of active (or primary) carrier less than absolute value<br>0x7: Reserved<br>NOTE: 0x1~0x4 not applicable for RTD trigger metric<br>NOTE: when type 0x1 is used together with function 0x3 or 0x4, the threshold value shall range from 32 dB (0x80) to +31.75 dB(0x7F). When type 0x1 is used together with function 0x1, 0x2, 0x5 or 0x6, the threshold value shall be interpreted as an unsigned byte with units of 0.25 dB, such that 0x00 is interpreted as −103.75 dBm and 0xFF is interpreted as −40 dBm<br>NOTE: Type 0x3 can only be used together with function 0x5 or function 0x6. |
| Action | TBD (MSB) | Action performed upon reaching trigger condition:<br>0x0: Reserved<br>0x1: Respond on trigger with AAI_SCN-REP<br>0x2: Respond on trigger with AAI_CM-REQ<br>0x3: Respond on trigger with AAI_SCN-REQ<br>0x4: Declare the carrier unreachable. If the carrier is a target carrier, the AMS needs not take immediate action when this trigger condition is met. The AMS shall act only when this condition is met for all assigned carriers of the AMS.<br>0x5: Cancel Carrier Management<br>0x6: Initiate Scanning<br>0x7: Reserved |

Referring to Table 10, the MC-specific trigger condition information may include a type field indicating a trigger metric type. The type field, as one example, indicates CINR metric when set to '0x0,' RSSI metric when set to '0x1,' RTD metric when set to '0x2,' the number of times that P-SFHs are not consecutively received (number of consecutive P-SFHs missed) when set to '0x3,' and RD metric when set to '0x4.'

Also, the MC-specific trigger condition information may include a function field indicating computation defining a trigger condition. As one example, upon the function field being set to '0x1,' the trigger condition is met when a metric of an assigned carrier is greater than an absolute value (or threshold value). Upon set to '0x2,' the trigger condition is met when a metric of an assigned carrier is less than an absolute value. Upon set to '0x3,' the trigger condition is met when a metric of an assigned carrier is greater than a metric of a primary carrier by a relative value. Upon set to '0x4,' the trigger condition is met when a metric of an assigned carrier is less than a metric of a primary carrier by a relative value. Upon set to '0x5,' the trigger condition is met when a metric of an active (or primary) carrier is greater than an absolute value. Upon set to '0x6,' the trigger condition is met when a metric of an active (or primary) carrier is less than an absolute value.

The MC-specific trigger control information may further include an action field, which is performed when reaching a trigger condition.

As one example, if the action field is set to '0x1,' the AMS transmits a scan reporting (SCN-REP) message with respect to the scan results to the ABS when a trigger condition is met. If set to '0x2,' the AMS transmits a carrier management request (CM-REQ) message to the ABS when the trigger condition is met. If set to '0x3,' the AMS transmits a scan request (SCN-REQ) message to the ABS when the trigger condition is met. If set to '0x4,' it indicates that the corresponding carrier is unreachable. If set to '0x5,' it indicates a carrier management cancellation. If set to '0x6,' scanning for an assigned carrier is initiated when the trigger condition is met.

The following Table 11 shows another example of Type/Function/Action item of the items included in the MC-specific trigger control information of Table 8.

Especially, Table 11 shows an example of merely defining values required for MC-specific trigger condition for carrier management. That is, function and action fields, as shown in Table 11, may be defined by merely including values required for carrier management.

TABLE 11

| Name | Size(bit) | Value |
|------|-----------|-------|
| Type | TBD (MSB) | Trigger metric type:<br>0x0: CINR metric<br>0x1: RSSI metric<br>0x2: RTD metric.<br>0x3: Metirc = number of consecutive P-SFHs missed<br>0x4: RD metric, 0x5~0x7: reserved |
| Function | TBD | Computation defining trigger condition:<br>0x0: Reserved<br>0x1: Metric of assigned carrier is greater than absolute value<br>0x2: Metric of assigned carrier is greater than primary carrier metric by relative value<br>0x3: Metric of active (or primary) carrier less than absolute value<br>0x4-0x7: Reserved<br>NOTE: 0x1~0x2 not applicable for RTD trigger metric<br>NOTE: when type 0x1 is used together with function 0x3 or 0x4, the threshold value shall range from 32 dB (0x80) to +31.75 dB(0x7F). When type 0x1 is used together with function 0x1, 0x2, 0x5 or 0x6, the threshold value shall be interpreted as an unsigned byte with units of 0.25 dB, such that 0x00 is interpreted as −103.75 dBm and 0xFF is interpreted as −40 dBm<br>NOTE: Type 0x2 can only be used together with function 0x3. |
| Action | TBD (MSB) | Action performed upon reaching trigger condition:<br>0x0: Reserved<br>0x1: Respond on trigger with AAI_SCN-REP<br>0x2: Respond on trigger with AAI_SCN-REQ<br>0x3: Initiate Scanning<br>0x4-0x7: Reserved |

If the trigger condition proposed in this specification is transmitted via a message different from AAI_SCD message for transmitting the HO-related trigger condition, it may be allowed that the trigger condition is used the same as the HO-related trigger condition but interpreted as different meaning.

The following Table 12 shows another example of Type/Function/Action item of the items included in the MC-specific trigger control information of Table 8.

TABLE 12

| Name | Size(bit) | Value |
|------|-----------|-------|
| Type | TBD (MSB) | Trigger metric type:<br>0x0: CINR metric, 0x1: RSSI metric, 0x2: RTD metric,<br>0x3: Metirc = number of consecutive P-SFHs missed, 0x4: RD metric, 0x5~0x7: reserved |
| Function | TBD | Computation defining trigger condition:<br>0x0: Reserved<br>0x1: Metric of neighbor ABS (assigned carrier) is greater than absolute value<br>0x2: Metric of neighbor ABS (assigned carrier) is less than absolute value<br>0x3: Metric of neighbor ABS (assigned carrier) is greater than serving ABS (primary carrier) metric by relative value<br>0x4: Metric of neighbor ABS (assigned carrier) is less than serving ABS (primary carrier) metric by relative value<br>0x5: Metric of serving ABS (active or primary carrier) greater than absolute value<br>0x6: Metric of serving ABS (active or primary carrier) less than absolute value<br>0x7: Reserved<br>NOTE: 0x1~0x4 not applicable for RTD trigger metric<br>NOTE: when type 0x1 is used together with function 0x3 or 0x4, the threshold value shall range from 32 dB (0x80) to +31.75 dB(0x7F). When type 0x1 is used together with function 0x1, 0x2, 0x5 or 0x6, the threshold value shall be interpreted as an unsigned byte with units of 0.25 dB, such that 0x00 is interpreted as −103.75 dBm and 0xFF is interpreted as −40 dBm<br>NOTE: Type 0x3 can only be used together with function 0x5 or function 0x6. |
| Action | TBD (MSB) | Action performed upon reaching trigger condition:<br>0x0: Reserved<br>0x1: Respond on trigger with AAI_SCN-REP<br>0x2: Respond on trigger with AAI_HO-REQ (AAI_CM-REQ)<br>0x3: Respond on trigger with AAI_SCN-REQ<br>0x4: Declare the carrier unreachable. If the carrier is a target carrier, the AMS needs not take immediate action when this trigger condition is met. The AMS shall act only when this condition is met for all assigned carriers of the AMS. |

TABLE 12-continued

| Name | Size(bit) | Value |
|------|-----------|-------|
| | | 0x5: Cancel HO (Carrier Management) |
| | | 0x6: Initiate Scanning |
| | | 0x7: Reserved |
| | | NOTE: 0x3 is not applicable when neighbor ABS metrics are defined (i.e., only Function valued 0x5 or 0x6 are applicable) |

As shown in Tables 8 to 12, when metrics of channel state information (CINR, RSSI, RTD), which the AMS measures from assigned secondary carriers, meet a scan initiating condition of the MC-specific trigger control information, the AMS initiates scanning for the assigned secondary carriers. Here, the AMS may perform scanning for the assigned secondary carriers (including inactive secondary carriers) when the scan trigger condition is met even without a scan response message transmitted from the ABS if necessary.

Also, when the scan results meet the scan reporting condition of the MC-specific trigger control information so as to trigger a scan reporting to the ABS, the AMS may transmit to the ABS CINR, RSSI, RTD and the like measured through the scanning (i.e., scan results) via the SCN-REP message.

Method for Transmitting MC-Specific Trigger Condition

Hereinafter, description will be made to each exemplary embodiment of transmitting the aforesaid MC-specific trigger control information (condition) from ABS to AMS via a particular message.

1. Transmission of MC-Specific Trigger Condition Via AAI_MC-ADV Message (1) When MC-Specific Trigger Condition is ABC-Specific The following Table 13 shows an example that the MC-specific trigger condition is transmitted via MC-ADV message and is ABS-specific.

TABLE 13

| Field | Size | Description |
|-------|------|-------------|
| MAC control Message Type | 8 | |
| Multicarrier configuration change count | 4 | Incremented by 1 upon each update |
| Service BS Carrier Number | 3 | |
| Serving BS Uniformity Flag | 1 | 0: All carriers supported by serving ABS have the same Protocol Version, SFH_Info<br>1: otherwise |
| Physical Carrier Index of current carrier | 6 | The carrier that ABS broadcast this message; the physical carrier index refers to AAI_Global-Config message. |
| MAC Protocol version | 8 | Consistent with REV. 2 definition, with new MAC protocol version 9 defined for 16 m |
| NIC-specific Trigger TLV | variables | MC-specific triggers with encoding defined in Table 9-12 Trigger description for assigned carriers<br>. . . |

(2) When MC-Specific Trigger Condition is Carrier-Specific

The following Table 14 shows an example that the MC-specific trigger condition is transmitted via MC-ADV message and is carrier-specific.

TABLE 14

| Field | Size | Description |
|-------|------|-------------|
| MAC control Message Type | 8 | |
| Multicarrier configuration change count | 4 | Incremented by 1 upon each update |
| Service BS Carrier Number | 3 | |
| Serving BS Uniformity Flag | 1 | 0: All carriers supported by serving ABS have the same Protocol Version, SFH_Info<br>1: otherwise |
| Physical Carrier Index of current carrier | 6 | The carrier that ABS broadcast this message; the physical carrier index refers to AAI_Global-Config message. |
| MAC Protocol version | 8 | Consistent with REV. 2 definition, with new MAC protocol version 9 defined for 16 m |
| For(i=1;i<=Serving BS Carrier Number−1; i++){<br>Physical carrier index<br>Paging carrier indication<br>SA-Preamble Index | | |

TABLE 14-continued

| Field | Size | Description |
|---|---|---|
| MC-specific Trigger TLV | variables | MC-specific triggers with encoding defined in Table 9-12 Trigger description for assigned carriers |

(3) When MC-Specific Trigger Condition is Network-Specific

The following Table 15 shows an example that MC-specific trigger condition is transmitted via MC-ADV message and is network-specific. In this case, the same trigger condition may be used in every cell and a trigger metric type used may be CINR.

TABLE 15

| Field | Size | Description |
|---|---|---|
| MAC control Message Type | 8 | |
| Multicarrier configuration change count | 4 | Incremented by 1 upon each update |
| Service BS Carrier Number | 3 | |
| Serving BS Uniformity Flag | 1 | 0: All carriers supported by serving ABS have the same Protocol Version, SFH_Info<br>1: otherwise |
| Physical Carrier Index of current carrier | 6 | The carrier that ABS broadcast this message; the physical carrier index refers to AAI_Global-Config message. |
| MAC Protocol version | 8 | Consistent with REV. 2 definition, with new MAC protocol version 9 defined for 16 m |
| For(i=1;i<=Serving BS Carrier Number−1; i++){<br>Physical carrier index<br>Paging carrier indication<br>SA-Preamble Index | | |
| MC-specific Trigger TLV | variables | MC-specific triggers with encoding defined in Table 9-12 Trigger description for assigned carriers |

2. Transmission of MC-Specific Trigger Condition Via AAI_NBR-ADV Message (1) When MC-Specific Trigger Condition is ABS-Specific The following Table 16 shows an example that MC-specific trigger condition is transmitted via NBR-ADV message and is ABS-specific.

TABLE 16

| M/O | Attributes/Array of attributes | Size(bit) | Value/Note | Conditions |
|---|---|---|---|---|
| M | Change Count | 3 | NBR-ADV Change Coutn | N.A. |
| M | Cell Type | 3 | Cell type in this message<br>0b000: macro, 0b001: micro, 0b010: macro hotzone, 0b011: femto, 0b100: relay, 0b101-0b111: reserved | N.A. |
| M | Total Number of AAI_NBR-ADV Segments | 4 | Total number of segments of AAI_NBR-ADV for this cell type. | N.A. |
| M | AAI_NBR-ADV Segment Index | 4 | Indicates current segment index of this message in the specific cell type. | N.A. |
| M | BS number M | 8 | Total number of BSs to be included in this AAI_NBR-ADV segment<br>... omitted ... | N.A. |
| O | Delta information | Var. | Delta encoding, w.r.t. the reference carrier the current carrier transmitting this message if SFH_encoding_format = 01, the preceding carrier if SFH_encoding_format = 11) | Shall be included for each neighbor BS if SFH_encoding_format is set to 0b01 or 0b11 |
| O | Neighbor-specific trigger | Var. | Optional neighbor-specific triggers with encoding defined in Trigger description | May be included for each neighbor BS |
| O | Neighbor MC-specific trigger | Var. | Optional neighbor MC-specific triggers with encoding defined in Table 9-12 Trigger description<br>... following fields omitted ... | May be included for each neighbor BS |

(2) When MC-Specific Trigger Condition is Carrier-Specific

The following Table 17 shows an example that the trigger condition is transmitted via NBR-ADV message and is carrier-specific.

TABLE 17

| M/O | Attributes/Array of attributes | Size(bit) | Value/Note | Conditions |
|---|---|---|---|---|
| M | Change Count | 3 | NBR-ADV Change Coutn | N.A. |
| M | Cell Type | 3 | Cell type in this message 0b000: macro, 0b001: micro, 0b010: macro hotzone, 0b011: femto, 0b100: relay, 0b101-0b111: reserved | N.A. |
| M | Total Number of AAI_NBR-ADV Segments | 4 | Total number of segments of AAI_NBR-ADV for this cell type. | N.A. |
| M | AAI_NBR-ADV Segment Index | 4 | Indicates current segment index of this message in the specific cell type. | N.A |
| M | BS number M | 8 | Total number of BSs to be included in this AAI_NBR-ADV segment . . . omitted . . . | N.A. |
| O | Delta information | Var. | Delta encoding, w.r.t. the reference carrier the current carrier transmitting this message if SFH_encoding_format = 01, the preceding carrier if SFH_encoding_format = 11) | Shall be included for each neighbor BS if SFH_encoding_format is set to 0b01 or 0b11 |
| O | Neighbor-specific trigger | Var. | Optional neighbor-specific triggers with encoding defined in Trigger description | May be included for each neighbor BS |
| O | Neighbor MC-specific trigger | Var. | Optional neighbor MC-specific triggers with encoding defined in Table 9-12 Trigger description . . . following fields omitted . . . | May be included for each carrier of neighbor BS |

3. Transmission of MC-Specific Trigger Condition Via MC-RSP Message (1) When MC-Specific Trigger Condition is ABS-Specific The following Table 18 shows an example that the trigger condition is transmitted via MC-RSP message and is ABS-specific.

TABLE 18

| Field | Size(bit) | Description |
|---|---|---|
| Global_Assign | 1 | Indicates whether the ABS assigns all the carriers requested by AMS through AAI_MC-REQ 0b0: The ABS assigns a subset of the carriers requested by AMS 0b1: The ABS assigns all the carriers requested by AMS |
| If (Global_Assign == 0) { | | |
|   Number of Assigned Carriers (N) | 3 | Number of Assigned Secondary Carriers. |
|   For (i=0; i<N; i++) { | | |
|     Physical carrier index | 6 | The index refers to a Physical carrier index in AAI_MC-ADV message. Logical carrier index is assigned implicitly in the order of assigned physical carrier index |
|   } | | |
| } | | |
| MC-specific Trigger TLV Support of data transmission over guard sub-carrier | variables | MC-specific triggers with encoding defined in Table 9-12 Trigger description for assigned carriers 0 = not support 1 = support |

(2) When MC-Specific Trigger Condition is Carrier-Specific

The following Table 19 shows an example that the trigger condition is transmitted via MC-RSP message and is carrier-specific.

TABLE 19

| Field | Size(bit) | Description |
|---|---|---|
| Global_Assign | 1 | Indicates whether the ABS assigns all the carriers requested by AMS through AAI_MC-REQ 0b0: The ABS assigns a subset of the carriers requested by AMS 0b1: The ABS assigns all the carriers requested by AMS |
| If (Global_Assign == 0) { | | |
|   Number of Assigned Carriers (N) | 3 | Number of Assigned Secondary Carriers. |
|   For (i=0; i<N; i++) { | | |

TABLE 19-continued

| Field | Size(bit) | Description |
|---|---|---|
| Physical carrier index | 6 | The index refers to a Physical carrier index in AAI_MC-ADV message. Logical carrier index is assigned implicitly in the order of assigned physical carrier index |
| MC-specific Trigger TLV } } | variables | MC-specific triggers with encoding defined in Table 9-12 Trigger description for assigned carriers |
| Support of data transmission over guard sub-carrier | | 0 = not support<br>1 = support |

FIG. 9 illustrates a method for reporting scan results of assigned secondary carriers via MC-ADV message including specific trigger conditions in accordance with a third exemplary embodiment.

As illustrated in FIG. 9, it is assumed that an ABS uses three carriers C_0 to C_2 as available carriers, the carrier C_0 of the three carriers is set to a primary carrier, and the others are set to assigned secondary carriers (i.e., a completed state of AAI_MC-REQ/RSP message exchange between ABS and AMS). Here, it is also assumed that the other assigned carriers C_1 and C_2 are inactive assigned secondary carriers. So, hereinafter, description will be made to a carrier scanning related operation for activating the carriers C_1 and C_2.

First, the AMS may exchange control information and data with the ABS via the primary carrier C_0 (S901).

The ABS may transmit a multicarrier advertisement (AAI_MC-ADV) message including trigger control information related to carrier management (e.g., secondary carrier activation or primary carrier change) to the AMS (S902).

Here, the carrier management related trigger control information may include trigger conditions, such as an assigned secondary carrier scanning trigger condition and a scan reporting trigger condition. Also, the carrier management related trigger control information may alternatively be transmitted via AAI_SCD message, AAI_MC-ADV message, AAI_NBR-ADV message, SFH or the like.

Here, when the carrier management related trigger control information includes the assigned secondary carrier scanning trigger condition, the AMS may perform scanning for the assigned secondary carriers if the scanning trigger condition set in the carrier management related trigger control information is met even without receiving a scan response (SCN-RSP) message from the ABS.

The base station, if necessary, may also instruct the AMS to perform scanning for the assigned secondary carriers by transmitting the SCN-RSP message to the AMS.

Accordingly, the AMS performs scanning for the carriers C_1 and C_2 (S903). When the scan results meet the condition set in the carrier management related trigger control information (S904), then the AMS reports the scan results to the ABS. Here, the AMS may transmit the scan results to the ABS via SCN-REP message (S905).

Afterwards, the ABS may refer to the scan results transmitted from the AMS to transmit a carrier management command (AAI_CM-CMD) message to the AMS so as to instruct activation of the assigned secondary carrier(s) C_1 and/or C_2 (S906).

Fourth Exemplary Embodiment

The fourth exemplary embodiment illustrates that an ABS transmits a trigger condition to an AMS via a unicast message when the ABS wants to receive SCN-REP message from the AMS in case where another trigger condition other than a predefined trigger condition has been satisfied.

At present, IEEE 802.16 defines the following three methods for transmitting to an ABS scan results of inactive carriers for secondary carrier activation or scan results of a neighbor ABS for HO.

(1) 0b00: No report (2) 0b01: Periodic report (3) 0b10: Event-triggered report (4) 0b11: One-time scan report That is, the ABS may inform the AMS of which one of the three methods is used to transmit SCN-REP, by a report mode of SCN-RSP message.

Also, IEEE 802.16 currently describes that an ABS transmits the trigger condition for each neighbor ABS or secondary/neighbor carrier to an AMS through broadcasting, as one example, via AAI_SCD, AAI_MC-ADV or AAI_NBR-ADV message. That is, the ABS may not transmit the trigger condition for a target to be scanned to the AMS through unicasting.

The following Table 20 shows an example of including trigger conditions when a report mode of SCN-RSP message is set to '0b10' (Event-triggered report).

TABLE 20

| Field | Size | Description | Condition |
|---|---|---|---|
| Recommended_Carrier_Index | 6 | Recommended physical carrier index for scan at each neighbor ABS. As defined in AAI_Global-CFG message | |
| Neighbor ABS index | 8 | ABS index corresponds to the position of ABS to be scanned in AAI_NBR-ADV message | |
| Neighbor-specific Trigger | variable | Neighbor-specific triggers with encoding defined in Table 9-12 Trigger description | Present when Report mode-0b10 and the corresponding carrier is required to apply different |

TABLE 20-continued

| Field | Size | Description | Condition |
|---|---|---|---|
| | | ... | trigger condition from definitions of AAI_SCD message. |
| Recommended Carrier Index | 6 | Recommended physical carrier index for scan at each neighbor ABS. As defined in AAI-Global-CFG message | |
| Neighbor-specific trigger | Variable | Neighbor-specific triggers with encoding defined in Table 9-12 Trigger description | Present when Report mode = 0b10 and the corresponding carrier is required to apply different trigger condition from definitions of AAI_SCD message. |
| | | ... | |

Referring to Table 20, when the report mode is the event-trigger report (as one example, '0b10') and scanning for OH is requested, the trigger condition for transmitting the scan results of each neighbor ABS or a carrier(s) of neighbor ABSs may be informed to the AMS via SCN-RSP message.

Therefore, upon reception of the AAI_SCN-RSP message including the above trigger condition, the AMS may perform scanning for the corresponding ABS or carrier(s), and transmit a scan reporting message to the ABS when the corresponding trigger condition is met.

The following Table 21 shows another example of including trigger conditions when the report mode of SCN-RSP message is set to '0b10' (Event-triggered report).

TABLE 21

| Field | Size | Description | Condition |
|---|---|---|---|
| | | ... | |
| Recommended_Carrier_Index at S-ABS | 6 | Recommended physical carrier index of the S-ABS the AMS plans to scan. | Present if AMS decides to scan other carriers of the S-ABS. |
| PCC-specific Trigger definitions | | Primary Carrier Change-specific triggers with encoding defined in Table 9-12 Trigger description | Present when Report mode = 0b10 and the corresponding carrier is required to apply different trigger condition from definitions of AAI-SCD message. |
| CA Trigger definitions | | Carrier Activation-specific triggers with encoding defined in Table 9-12 CA-specific Trigger description. | Present when Report mode-0b10 and the corresponding carrier is required to be scanned for carrier activation. |

Referring to Table 21, when the report mode is the event-triggered report (as one example, '0b10') and scanning is requested from the AMS for secondary carrier activation, a carrier activation-specific (CA-specific) trigger definitions for transmitting the scan results of each secondary carrier to the ABS may be informed via SCN-RSP message.

Also, when the report mode is the event-triggered report and the scanning is requested for primary carrier change, PCC-specific trigger definitions for transmitting scan results of each target inactive carrier may be informed via SCN-RSP message.

Consequently, upon reception of AAI_SCN-RSP message including the trigger condition from the ABS, the AMS may perform scanning for the corresponding carrier and then transmit a scan reporting message to the ABS when the corresponding trigger condition is met.

Figure 10:
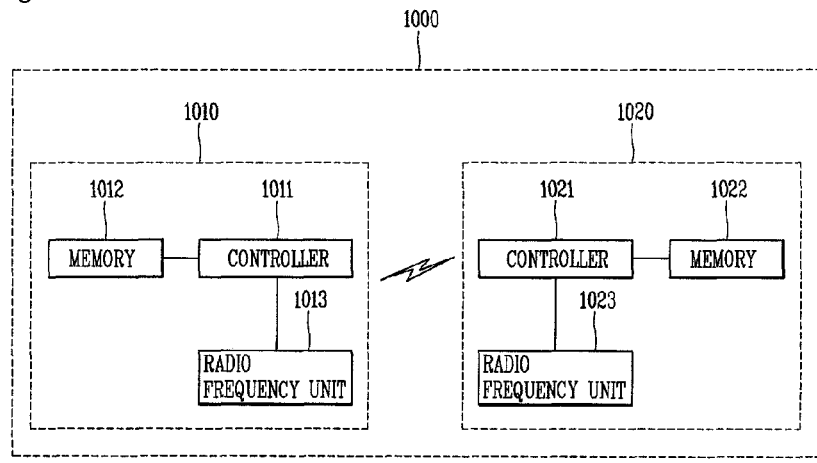
FIG. 10 is a block diagram of a wireless communication system in accordance with one exemplary embodiment.

FIG. 10 is a block diagram of a wireless communication system in accordance with one exemplary embodiment.

An ABS 1010 may include a controller 1011, a memory 1012 and a radio frequency (RF) unit 1013.

The controller 1011 may be configured to implement proposed functions, processes and/or methods. Radio interface protocol layers may be implemented by the controller 1011.

The controller 1011 may control a message (as one example, MC-ADV), which includes scan reporting trigger conditions for inactive secondary carriers, to the AMS when decided to activate inactive secondary carriers.

The memory 1012 may store protocols or parameters for scan reporting trigger conditions of inactive secondary carriers. The RF unit 1013 may be connected to the controller 1011 to transmit and/or receive radio signals.

An AMS 1020 may include a controller 1021, a memory 1022 and an RF unit 1023.

The controller 1021 may be configured to implement proposed functions, processes and/or methods. Radio interface protocol layers may be implemented by the controller 1021. The controller 1021 may control the scan results to be transmitted to the ABS via a scan reporting message when a scan reporting trigger condition of inactive secondary carriers is met according to the scan results of the inactive secondary carriers.

The memory 1022 may be connected to the controller 1021 to store protocols or parameters for scan reporting of the inactive secondary carriers. The RF unit 1023 may be connected to the controller 1021 to transmit and/or receive radio signals.

The controller 1011, 1021 may include application-specific integrated circuit (ASIC), other chipset, a logical circuit and/or data processor. The memory 1012, 1022 may include a read-only memory (ROM), a random access memory (RAM), a flash memory, a memory card, a storage medium and/or other storage device. The RF unit 1013, 1023 may include a baseband circuit for processing radio signals. In a software implementation of the embodiment, the aforesaid schemes may be implemented by a module (process, function, etc.) for performing the aforesaid functions. The module may be stored in the memory 1012, 1022, and performed by the controller 1011, 1021. The memory 1012, 1022 may be present inside or outside the controller 1011, 1021, or connected to the controller 1011, 1021 via various well-know elements.

The invention claimed is:

1. A method for scanning assigned secondary carriers in a multicarrier system, the method performed by a terminal and comprising:
    receiving a multicarrier advertisement (MC-ADV) message from a base station (BS) via a primary carrier, the MC-ADV message including information related to a plurality of secondary carriers supported by the BS and trigger control information that includes a trigger condition specifying criteria for reporting a scan result;
    transmitting a multicarrier request (MC-REQ) message to the BS, the MC-REQ message including information related to a plurality of secondary carriers supported by the terminal;
    receiving a multicarrier response (MC-RSP) message from the BS, the MC-RSP message including information related to a plurality of inactive assigned secondary carriers, the plurality of inactive assigned secondary carriers determined based on the transmitted MC-REQ message;
    receiving a scan response (SCN-RSP) message from the BS, the SCN-RSP message for scanning the plurality of inactive assigned secondary carriers;
    scanning the plurality of inactive assigned secondary carriers;
    reporting the scan result to the BS when the trigger condition is met; and
    receiving a carrier management command from the BS for activating one or more secondary carriers in addition to the primary carrier,
    wherein the one or more secondary carriers to be activated are selected from the plurality of inactive assigned secondary carriers based on the scan result.

2. The method of claim 1, wherein reporting the scan result comprises transmitting the scan result to the BS via a scan report (SCN-REP) message.

3. The method of claim 1, wherein the trigger control information is a carrier activation specific trigger field.

4. The method of claim 1, wherein the trigger control information further includes a trigger type field that is defined as a carrier to interference and noise ratio (CINR) or as a received signal strength indicator (RSSI).

5. The method of claim 1, further comprising receiving a first message from the BS, the first message including a scanning required indicator indicating whether to scan the assigned secondary carriers.

6. The method of claim 5, wherein the scanning required indicator is 1-bit in size.

7. The method of claim 5, wherein the first message is a multi-carrier response (MC-RSP) message, an MC-ADV message, or a neighbor advertisement (NBR-ADV) message.

8. The method of claim 5, wherein whether to scan is determined based upon coverage of the assigned secondary carriers.

9. A terminal for scanning assigned secondary carriers in a multicarrier system, the terminal comprising:
    a radio frequency (RF) unit configured to:
        receive a multicarrier advertisement (MC-ADV) message from a base station (BS), the MC-ADV message including information related to a plurality of secondary carriers supported by the BS and trigger control information that includes a trigger condition specifying criteria for reporting a scan result:
        transmit a multicarrier request (MC-REQ) message to the BS, the MC-REQ message including information related to a plurality of secondary carriers supported by the terminal;
        receive a multicarrier response (MC-RSP) message from the BS, the MC-RSP message including information related to a plurality of inactive assigned secondary carriers, the plurality of inactive assigned secondary carriers determined based on the transmitted MC-REQ message; and
        receive a scan response (SCN-RSP) message from the BS, the SCN-RSP message for scanning the plurality of inactive assigned secondary carriers; and
    a processor configured to scan the plurality of inactive assigned secondary carriers,
    wherein the RF unit is further configured to report the scan result to the BS when the trigger condition is met and receive a carrier management command from the BS for activating one or more secondary carriers in addition to the primary carrier, and
    wherein the one or more secondary carriers to be activated are selected from the plurality of inactive assigned secondary carriers based on the scan result.

10. The terminal of claim 9, wherein reporting the scan result comprises transmitting the scan result to the BS via a scan report (SCN-REP) message.

11. The terminal of claim 9, wherein the trigger control information further includes a trigger type field that is defined as a carrier to interference and noise ratio (CINR) or as a received signal strength indicator (RSSI).

12. The terminal of claim 9, wherein the trigger control information is a carrier activation specific trigger field.

13. The terminal of claim 9, wherein the controller is further configured to control the RF unit to receive a first message from the BS, the first message including a scanning required indicator indicating whether to scan the assigned secondary carriers.

14. The terminal of claim 13, wherein the scanning required indicator is 1-bit in size.

15. The terminal of claim 13, wherein the first message is a multi-carrier response (MC-RSP) message, an MC-ADV message, or a neighbor advertisement (NBR-ADV) message.

16. The terminal of claim 13, wherein whether to scan is determined based upon coverage of the assigned secondary carriers.

\* \* \* \* \*